June 26, 1962 C. E. SCHOU 3,040,408
LIFT TRUCK SHIFT

Filed Feb. 3, 1959 4 Sheets-Sheet 1

INVENTOR.
CARL E. SCHOU
BY
Strauch, Nolan & Neale
ATTORNEYS

INVENTOR.
Carl E. Schou

June 26, 1962  C. E. SCHOU  3,040,408
LIFT TRUCK SHIFT
Filed Feb. 3, 1959  4 Sheets-Sheet 3

INVENTOR.
Carl E. Schou
BY
Strauch, Nolan + Neale
ATTORNEYS

June 26, 1962  C. E. SCHOU  3,040,408
LIFT TRUCK SHIFT
Filed Feb. 3, 1959  4 Sheets-Sheet 4

INVENTOR.
Carl E. Schou
BY
Strauch, Nolan & Neale
ATTORNEYS

United States Patent Office 3,040,408
Patented June 26, 1962

3,040,408
LIFT TRUCK SHIFT
Carl Einar Schou, Oshkosh, Wis., assignor to Rockwell-Standard Corporation, Coraopolis, Pa., a corporation of Pennsylvania
Filed Feb. 3, 1959, Ser. No. 790,838
9 Claims. (Cl. 74—377)

This invention relates to improvements in vehicle drive mechanisms and is more particularly concerned with a power transmitting clutch for forward and reverse shifting of a vehicle transmission.

It has been recognized that rapid and fast acting selective shifting between forward and reverse drives is a primary requisite in promoting the improved maneuverability of vehicles of the shop lifting and pay loader type. In order to effect rapid shifting between forward and reverse drives, fast acting dual clutches of the heavy duty type have been customarily employed to indirectly couple a vehicle engine to an output shaft. In this manner, the direction of rotation of the output shaft may be quickly reversed by operation of the clutch.

It has been found, however, that the clutch elements in drive trains of the type which are presently available tend to overheat and to wear rapidly, consequently requiring replacement or repair. Since it is accepted and customary in the art to employ dual clutch mechanisms for quick reversals in power transmission, these difficulties of overheating and wear have been substantially accepted as unavoidable.

The present invention therefore contemplates and has as its purpose the provision of a special multiple disc wet type clutch which facilitates quick and rapid shifting and obviates overheating and excessive clutch disc wear in frequently accomplishing the rapid shifting between forward and reverse drives.

Accordingly, with the foregoing considerations and purposes in mind, it is the major object of this invention to provide in a drive train for trucks of the shop lift and pay loader type, a novel fast acting forward and reverse operating clutch which is not subject to overheating and rapid wear.

It is further the object of this invention to provide for a reversible power transmission in which an engine is indirectly coupled to an output shaft by a novel clutch device which facilitates the rapid reversal of direction of rotation of the output shaft.

It is further the object of this invention to provide for a novel friction clutch mechanism embodying means for applying a liquid coolant to the clutch faces thereof to reduce wear and tendency to overheat.

It is further the object of this invention to provide for a novel clutch of the multiple disc type for forward and reverse shifting of a lift truck transmission in which the disc plates of the clutch are cooled by applying a liquid coolant to the surfaces of the plate.

It is a further object of this invention to provide in a transmission drive train, a novel rotatable hydraulically operated wet clutch for balancing the centrifugal forces engendered by rotation of hydraulic fluid filled chambers embodied in the clutch.

Still another object of this invention is to provide for a novel hydraulically operated multiple disc type clutch device in which the driving clutch member is continuously and resiliently urged to a neutral disengaged position by spring discs so that the clutch pressure and backing discs are quickly separated when hydraulic pressure is released thereby obviating excessive wear and overheating of the discs.

A further object of this invention is to provide a novel multiple disc type clutch embodying an axially movable outer shell for engaging the driving and driven discs.

It is further the object of this invention to provide a novel clutch device for forward and reverse shifting of a vehicle transmission of relatively simplified construction, compactly organized and comparatively inexpensive to manufacture.

These and other objects will presently become apparent by reference to the appended claims and as the description proceeds in connection with the accompanying drawings, wherein:

Figure 1:
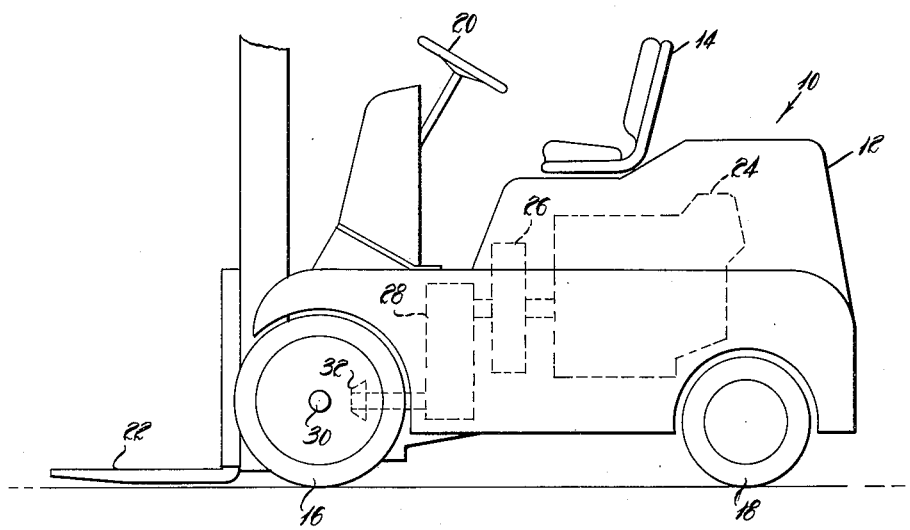
FIGURE 1 is a side elevation view of an industrial lift truck embodying the principles of the present invention.

Referring now to FIGURE 1 and adverting first to the general assemblage, a lift truck of conventional structure and embodying the principles of the invention is there illustrated and generally designated at 10, having a body 12, an operator's seat 14 mounted on the body between the front ground engaging drive wheels 16 and the rear ground engaging steering wheels 18, a steering wheel 20 suitably connected to the rear wheels 18 and lift forks 22. The lift truck 10, constituting the present invention, comprises, in outline, a prime mover 24 such as an internal combustion engine mounted on the truck chassis (not shown), a fluid torque converter 26 suitably drive connected to the prime mover, a clutch and transmission unit 28 connected to the output of the torque converter and incorporating a transfer gear case, and a forward rear axle type drive unit 30 which drives the wheels 16. Power is transmitted to the axle drive unit 30 from a suitable differential and bevel gear set (not shown) which is connected to the output of the transmission unit 28 by a pinion 32.

Figure 4:
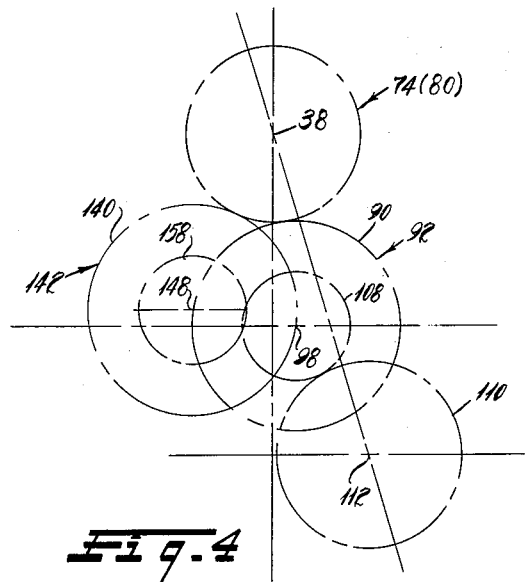
FIGURE 4 is a schematic view of the transmission forward and reverse gear train of the lift truck of FIGURE 1.
Figure 2:
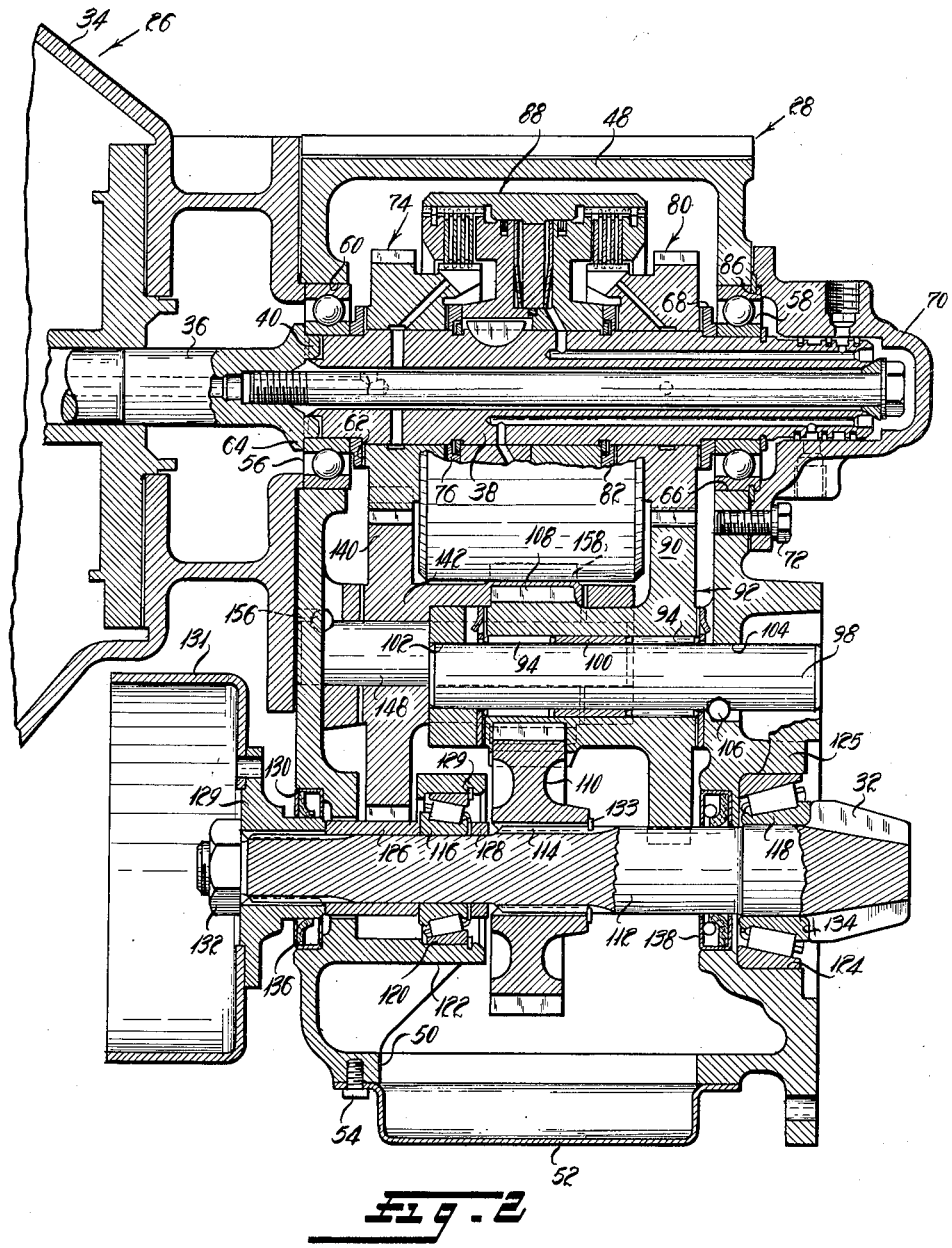
FIGURE 2 is a cross-sectional view in elevation illustrating the transmission and the forward and reverse clutch arrangement of the lift truck of FIGURE 1.
Figure 3:
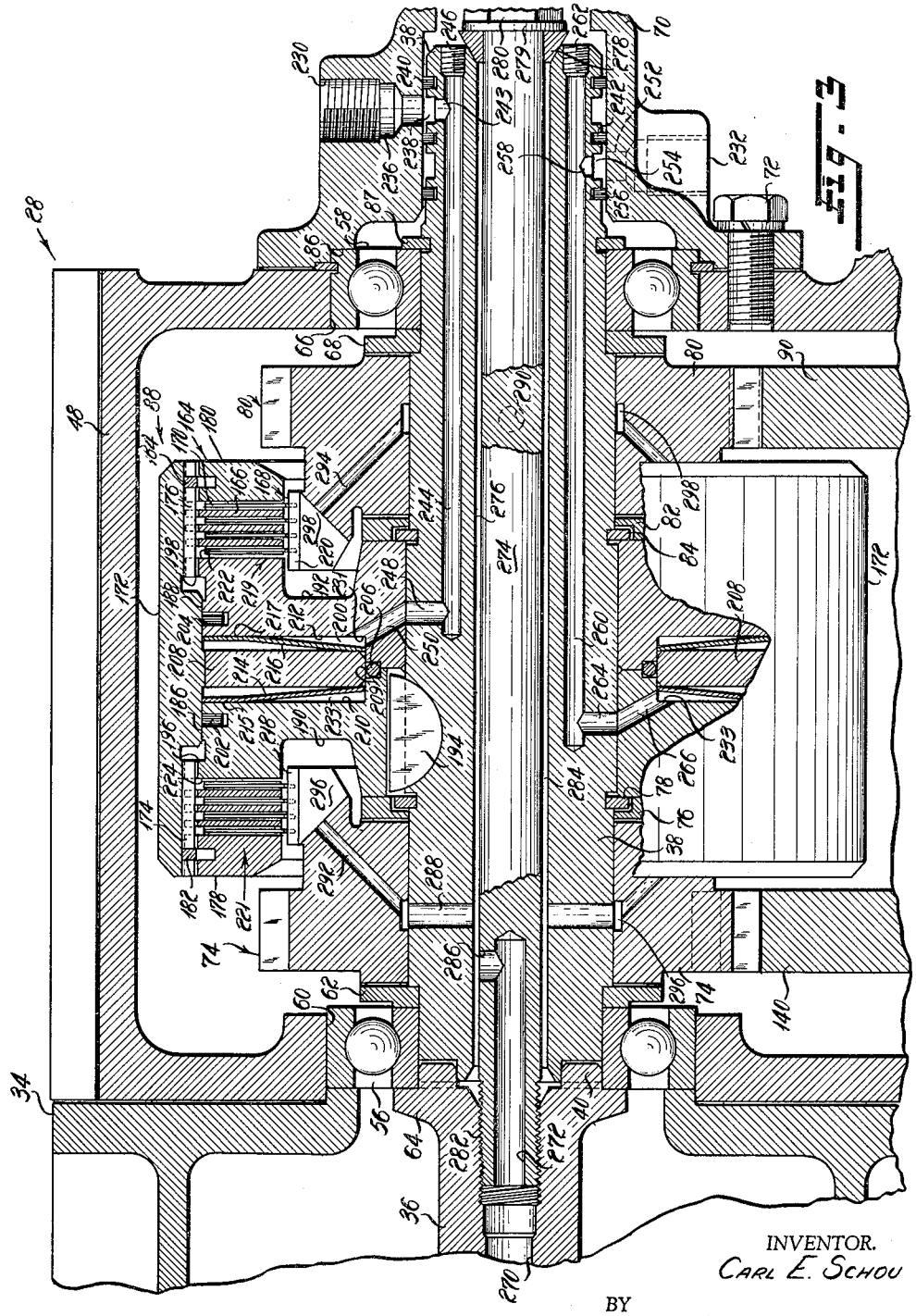
FIGURE 3 is a fragmentary enlarged detailed view of a portion of FIGURE 2.

Referring now in detail to the exemplified form of the invention shown in FIGURES 2–4, the fluid torque converter 26 which is housed in a casing 34 is of suitable standard construction and is provided with an output shaft 36 connected to the power input shaft 38 of the transmission unit 28 by a suitable separable coupling 40.

The transmission unit 28 is provided with a housing 48 having an open bottom 50 covered by a suitable oil sump pan 52 removably secured to the housing by a series of bolts or cap screws 54. The power input shaft 38 driven by the torque converter 26 is journalled within the housing 48 at its left end (FIGURE 2) in a ball bearing assembly 56 and at its right end in a ball bearing assembly 58. Ball bearing assembly 56 is pressfitted in a circular opening 60 in housing 48 and the inner race thereof is secured against axial movement in both directions by a spacer ring 62 which urges the inner race against casing 34, whereas the outer race of bearing assembly 56 is restrained axially in one direction by a shoulder 64 extending radially from output shaft 36. Ball bearing assembly 58 is similarly pressfitted within an opening 66 and its inner race is being restrained from axial movement in both directions by a spacer ring 68 which urges the inner race against a snap ring 87 secured on input shaft 38, its outer race is being limited against axial movement by means of a bearing snap ring 69 clamped between transmission housing 48 and a commutator type housing 70 which is fixed to housing 48 by a series of cap screws 72.

A reverse clutch gear 74, as will hereinafter be described, is journalled for free rotation on input shaft 38 abuttingly between spacer 62 and another spacer ring 76, the latter spacer being urged against a snap ring 78 which is seated in an annular peripheral groove in the shaft to restrain axial movement of the spacer 76, reverse gear 74, spacer 62 and bearing 56 (FIGURE 3). Similarly, a forward clutch gear 80, as will hereinafter be described, is journalled for free rotation on input shaft 38 abuttingly between spacer 68 and another spacer ring 82. The spacers 68 and 82 with the forward clutch gear therebetween, and the bearing 58 are restrained against axial movement by a snap ring 84 which radially abuts spacer 82 and is seated in an annular peripheral groove in shaft 38 to urge the elements 82, 80, 68 and 58 against an annular shoulder 86 formed by housing 70 and snap ring 87 seated in a peripheral groove in shaft 38.

A dual friction clutch 88 is mounted on the input shaft 38 between spacers 76 and 82 and functions to selectively couple the input shaft 38 with either the forward clutch gear 80 or the reverse clutch gear 74 as will become apparent as the description proceeds. The forward clutch gear 80 is in constant meshing engagement with large gear 90 of the double forward transfer gear 92 which is freely rotatable upon two needle bearings 94 mounted on a non-rotatable cross shaft 98 and spaced axially apart by sleeve 100. This shaft 98 is vertically offset and underlies the input shaft 38 to one side thereof (FIGURE 4) and is non-rotatably mounted in aligned openings 102 and 104 in opposed wall portions of the transmission housing 48, being suitably keyed thereto as indicated at 106.

The small gear 108 of the double forward transfer gear 92 is in constant meshing engagement with a spur gear 110 which is splined to a reversible output shaft 112 at a shaft splined section 114. This reversible output shaft 112 is still more vertically offset from shaft 38 and is rotatably supported in housing 48 by opposed tapered roller thrust bearings 116 and 118 which are respectively press-fitted in a circular opening 120 provided in housing flange 122 and an annular recess 124 in section 125 of housing 48. Bearing 116 is restrained from axial movement by a spacer 126 mounted on the output shaft 112 which urges the bearing into abutment with a spacer 128 and a snap ring 129 seated in an annular peripheral groove in the opening 120. The spacer 128 is mounted on the output shaft 112 between the bearing 116 and the spur gear 110 so as to restrain the latter from axial movement to the left. The outer end of spacer 126 abuts the hub of brake mounting flange 129 which is splined to the left-hand end of the output shaft 112 projecting beyond the housing 48 through the circular opening 130 and has a brake drum 131 suitably secured thereto.

This brake mounting flange is secured against longitudinal movement by nut 132 which is threaded on to the reduced diameter threaded terminating end of shaft 112 and urges the brake flange 129 into abutment with the spacer 126. Thus, the nut 132 and the snap ring 133 which is seated in an annular peripheral groove in the shaft 112 in radial abutment with gear 110, function as stops in restraining from longitudinal movement the brake flange 129, the spacer 126, bearing 116, spacer 128 and gear 110 which respectively abut each other in succession. Tightening of the nut 102 shifts the shaft axially to the left to bring the shoulder 134 of the output shaft pinion 32 into abutment with bearing 118 so as to secure the latter from longitudinal movement in the annular recess 124.

In order to prevent leakage of oil out of the oil sump, oil seals 136 and 138 are provided to the opposed ends of the output shaft 112 and are press-fitted into recesses formed by the transmission housing 48.

The reverse clutch gear 74 is in constant meshing engagement with large gear 140 of the double reverse transfer gear 142 which is freely rotatable upon suitable needle bearings (not shown) mounted on a non-rotatable cross shaft 148. This cross shaft 148 is vertically offset toward the other side from input shaft 38 and horizontally above cross shaft 98 (FIGURE 4) and is non-rotatably mounted in aligned openings (not shown) in opposed walls of the transmission housing 48 being suitably keyed thereto as indicated at 156. The small gear 158 of the double reverse transfer gear 142 is in constant meshing engagement with the small gear 108 of the double forward transfer gear 92 as best shown in FIGURE 4.

Consequently, it will be appreciated that a continuous meshing forward gear train is established initiating with forward gear 80 which meshes with large gear 90 to drive small gear 108 which is in continuous meshing engagement to spur gear 110 fixedly mounted on output shaft 112. The reverse gear train similarly is established initiating with reverse gear 74 which meshes with large gear 140 to drive small gear 158 which is in continuous meshing engagement with small gear 108 of the double forward transfer gear 92 so as to couple with spur gear 110 and shaft 112.

Referring now to FIGURE 3, the dual friction clutch 88 in accordance with the present invention embodies a dual pressure plate structure 164 with axially spaced annular pressure plates 166 and a dual backing plate structure 168 with annular backing plates 170 positioned between the pressure plates 166 for cooperative facial engagement with adjacent pressure plates in relatively actuating the clutch disc assemblies of the dual friction clutch unit by shifting the pressure plate structure in opposite axial directions.

The pressure plate structure 164 comprises a cylindrical clutch shift collar 172 concentric with the axis of input shaft 38 and having its internal wall provided with two spaced apart sets of peripheral splines 174 and 176 which are in driving engagement with the outer peripheral splines of the spaced apart annular pressure plates 166. Partly enclosing each end of the clutch collar 172 are ring-shaped plates 178 and 180 fixedly secured to the clutch collar by snap rings 182 and 184 which are seated in longitudinal spaced annular peripheral grooves in the collar.

The clutch shift collar 172 is concentrically mounted on the radially abutting clutch drums 190 and 192, being slidable over the outer peripheral drum surfaces 186 and 188 so as to enclose the clutch drums. These clutch drums are non-rotatably mounted on the input shaft 38 and are restrained against longitudinal movement between snap rings 78 and 84 with their associated spacer rings 76 and 82 in assembled relation, the drum 190 being suitably keyed to shaft 38 as indicated at 194. The outer periphery of the clutch drums 190 and 192 are splined at 196 and 198 respectively for selective driving engagement with the longitudinal spaced apart sets of splines 174 and 176 of clutch shift collar 172.

An annular recess provided between the clutch drums 190 and 192 forms a hydraulic fluid closed annular pressure chamber 200 concentric with the clutch shift collar and coaxial with the axis of input shaft 38. To limit the loss of fluid introduced into the chamber 200 as will be hereinafter described, annular felt seals 202 and 204 are provided in the outer sliding surfaces 186 and 188 and are respectively carried by the peripheral longitudinal grooves in the clutch drums 190 and 192. Further sealing the pressure chamber 200 is an O-ring 206 disposed in a peripheral annular recess formed between the drums 190 and 192.

Depending radially into the annular hydraulic pressure chamber 200 is a radially inwardly extending annular flange 208 which is integral with or otherwise suitably secured to the clutch shift collar 172 intermediate the ends thereof. This annular flange 208 abuts the recessed surfaces of the drums 190 and 192 at 209 to compress the O-ring 206 and is urged into spaced apart relation between the hydraulic pressure chamber side walls 210 and 212 by disc springs 214 and 216 respectively. Thus, the annular flange 208 functions as a double-acting piston and is longitudinally shiftable together with its attached clutch shift collar 172 in opposite longitudinal directions by introduction of hydraulic fluid into the annular pressure chamber 200 from either side of the chamber as will be hereinafter described.

Disc springs 214 and 216 each are formed with outer radial portions 215 and 217 respectively which engage opposing radial surfaces of drums 190 and 192. These springs are bent inwardly toward the annular piston 208 to facially engage the latter at its innermost marginal edges.

The reverse clutch gear 74 and the forward clutch gear 80 are splined at 218 and 220 respectively for driving engagement with separate longitudinal spaced sets of internally splined clutch backing plates 170 which are positioned between the pressure plates 166. The set of backing and pressure plates associated with the forward drive is indicated at 219 while the set of backing and pressure plates associated with reverse drive is indicated at 221. Thus, the separate forward and reverse sets 219 and 221 of backing plates 170 and pressure plates 166 associated with forward and reverse gears 80 and 74 are axially shiftable so that adjacent plates in a selected set facially engage with each other to effect selective coupling of either the reverse clutch gear 74 or the forward clutch gear 80 with the input shaft 38. When the clutch shifting collar is selectively shifted to the left along its axis, the clutch ring 180 shifts the pressure plates 166 and backing plates 170 of the forward clutch disc set 219 axially to the left so that the backing plates and pressure plates are pressed facially together between the clutch ring 180 and the radial surface 222 of the axially restrained clutch drum 192. Thus, since the pressure plates 166 are in driving engagement with the clutch shift collar 172 which rotates with the clutch drums 190 and 192 and the input shaft 38 is drive connected to backing plates 170, gear 80 will rotate with the shaft 38.

Similarly, shifting the clutch shift collar 172 axially to the right will axially shift the pressure plates 166 and the backing plates 170 of the reverse clutch disc set 221 located to the left of the annular piston 208, towards the radial surface of the axially restrained clutch drum 190 which is rotating with the shaft 38. Consequently, the reverse clutch disc set 219 of pressure plates 166 and the backing plates 170 will be facially forced together between the clutch ring 178 and the radial surface 224 of the axially restrained clutch drum 190 to drivingly connect the reverse clutch gear 74 to the input shaft 38.

In order to introduce hydraulic fluid to the annular hydraulic pressure chamber 200 on either side of the annular piston 208 to thereby effectuate axial movement of the piston 208 in opposite axial directions and correspondingly the shift collar 172, hydraulic fluid is introduced under pressure through separate oil lines (not shown) from a manually operated control valve (not shown) which is connected to a reservoir source (not shown). These oil lines are respectively connected to an inlet port 230 in the commutator housing 70 to facilitate introduction of oil under pressure into the right-hand end of the chamber 200 as indicated at 231 for forward drive, and to inlet port 232 in housing 70 to facilitate introduction of oil under pressure to the left-hand end of chamber 200 as indicated at 233 for reverse drive. The forward drive port 230 communicates with a passage 236 through the housing 70 which in turn communicates with an annular peripheral groove 238. This groove 238 is sealed off fluid tight with the inner periphery of the housing 70 between fluid seals 240 and 242 and is connected with a short transverse passage 243 in the shaft 38. The transversely extending passage 243 intercepts the longitudinally extending channel 244 which is offset and parallel to the axis of the shaft 38. This channel 244 is plugged at the commutator housing end as indicated at 246 and axially extends to underlie the clutch drum 192 where it is intercepted by a transversely extending passage 248. Passage 248 is aligned with and communicates with an angularly disposed passage 250 which opens into the right-hand side 231 of the hydraulic pressure chamber 200.

Similarly, the reverse drive inlet port 232 communicates with a passage 252 extending transversely through the housing 70 and which in turn communicates with an annular peripheral groove 254 on shaft 38. This groove 254 is sealed off fluid tight with the inner periphery of the commutator housing 70 between fluid seals 242 and 256. The annular groove 254 communicates with a short transverse passage 258 provided in the input shaft 38 which intercepts a longitudinally extending channel 260 which is offset from and parallel to the axes of the shaft 38. The channel 260 is plugged at the commutator housing end as indicated at 262 and axially extends to underlie the clutch drum 190 where it is intercepted by a transversely extending passage 264. Passage 264 communicates and is aligned with an angularly disposed passage 266 in drum 190 which opens to the left-hand end 233 of the annular pressure chamber 200.

Thus, in operation, to establish the forward drive, hydraulic fluid under pressure is introduced through port 230, channel 244 and passage 250 to the right-hand end 231 of the hydraulic pressure chamber 200 to urge the annular piston 208 axially to the left against the pressure of disc spring 214. The clutch shift collar 172 which is shifted with the annular piston 208 presses the clutch pressure plates 166 and the clutch backing plates 170 of the forward drive disc clutch set 219 facially together in driving engagement between the radial face 222 of drum 192 and the clutch ring 180, which ring and drum are rotating with the input shaft 38. Since the backing plates of disc set 219 are in driving engagement with the forward clutch gear 80 as hereinbefore described, the forward clutch gear which is mounted for free rotation on shaft 38 is thereby coupled to the input shaft 38 so as to rotate therewith. Consequently, forward rotation of the output shaft 182 will be established through the gear train which is composed of gears 80, 92, 108 and 110 to drive the truck 10 in a forward direction.

To establish the reverse drive, hydraulic fluid under pressure is introduced through the port 232, channel 260 and passage 266 to the left-hand end 233 of hydraulic pressure chamber 200 to urge piston 208 axially to the right against the pressure of disc spring 216. This shifts the clutch shift collar 172 with the piston 208 and the clutch ring 178 to the right so as to press the clutch pressure plates 166 and the clutch backing plates 170 of the reverse disc clutch set 221 facially together in driving engagement between the radial face 224 and the clutch ring 178, which ring and drum are rotating with the shaft 38. Thus, since the backing plates of disc set 221 are in driving engagement with the reverse clutch gear 74 as hereinbefore described, the reverse clutch gear which is mounted for free rotation is thereby coupled to the input shaft 38 so as to rotate therewith. Consequently, reverse rotation of the output shaft 112 will be established through the gear train composed of gears 74, 140, 158, 108 and 110 to drive the truck 10 in a reverse direction.

In order to return the piston to a centrally located neutral position as illustrated in FIGURE 3, from either the forward or the reverse positions thereby to uncouple the forward clutch gear 80 and the reverse clutch gear 74 from the input shaft 38, the hydraulic pressure on the annular piston 208 is released. When the annular piston 208 is in its forward shift position, and the hydraulic pressure thereon is released, the disc spring 214 urges the piston 208 and the clutch shift collar 172 axially to the right thus quickly releasing the pressure applied to the clutch pressure plates 166 and the clutch backing plates 170 of the forward drive friction disc set 219 so that the adjacent faces of facially engaging discs are quickly separated. Thus, the action of the spring 214 acts to overcome the inertia of the moving parts so as to eliminate a dragging contact between the friction discs after the hydraulic pressure has been released. In urging the piston 208 to its neutral position, spring disc 214 further functions to accelerate the discharge of the hydraulic fluid in the chamber 200 to the hydraulic reservoir. Thus, the return of the annular piston to a neutral position from an engaging forward position is quickly facilitated to prevent excessive wear and overheating of the clutch friction discs since there is little or no relative movement between the discs during the disengaging period.

Similarly, the shift return of the annular piston from its reverse engaging position is rapidly accomplished and facilitated by disc spring 216 which is compressed when the annular piston is in its reverse engaging position. Consequently, when the pressure is released and the piston thereby is allowed to return to the neutral position from the reverse engaging position, spring 216, similar to the action facilitated by spring 214, urges the piston to its centrally located position thereby quickly separating the pressure plates 166 from the backing plates 170 of the reverse drive friction disc clutch set 221 so as to eliminate the excessive wear and overheating of the friction disc plates which is attributed to the delay in relative movement between the discs after the hydraulic pressure has been released.

Consequently, it will be appreciated that the disc springs 214 and 216 provide balancing forces on the piston 208 to equalize the hydraulic fluid pressure on either side thereof in chamber 200. These disc springs 214 and 216 further function to counteract centrifugal forces established by fluid in the chamber and also by lubricating oils acting centrifugally to lubricate the friction clutch discs as will be described. This is accomplished by facially engaging the annular piston at its innermost radial marginal edge on either side with the innermost radial marginal edges of spring discs 214 and 216 as hereinbefore desecribed so that the tendency of centrifugal forces to misalign the dual friction clutch 88 with the axis of the input shaft 38 is counteracted and compensated for.

It further will be appreciated that the sliding surfaces 186, 188 and 209 between the clutch shift collar 172 and the clutch drums 190 and 192 are minimized to reduce the friction between these relatively moving parts, which friction tends to retard and slow down the shifting between forward, neutral and reverse positions.

With reference to FIGURES 2 and 3, lubrication and cooling of the clutch pressure and backing discs 166 and 170 is accomplished in a simple and effective manner by pumping excess oil in the torque converter 26 with suitable pumping means (not shown) through the bore 270 of the torque converter output shaft 36 communicating with the central bore 272 of shaft rod 274 which is coaxially mounted within a central through bore 276 of the transmission input shaft 38. This coaxial shaft rod 274 is mounted in the transmission input shaft in spaced-apart relation with the inner periphery of the central bore 276 by providing an annular wedge-shaped plug 278 which supports the right hand end of the shaft rod at the commutator housing 70. The tapered face of the plug 278 is held firmly against the edges of the bore 276 by a washer 279 and a machine bolt 280, the latter being threaded coaxially into the end of the shaft rod. The torque converter end of the shaft rod 274 projects beyond the shaft 38 and is threaded at 282 into the bore 270 of the torque converter output shaft 36. The annular chamber 284 thereby formed between the shaft rod 274 and the inner periphery of the input shaft through bore 276 communicates with the shaft rod bore 272 through a transversely extending passage 286 which opens into the annular chamber 284 and is intersected by the shaft rod bore 272. The input shaft 38 is provided with spaced apart transversely extending passages 288 and 290 which respectively underlie the reverse clutch gear 74 and the forward clutch gear 80 and are intersected by the input shaft bore 276 to communicate with the annular chamber 284. Communicating with the transversely extending passages 288 and 290 are angularly extending openings 292 and 294 respectively, which are respectively formed in the reverse clutch gear 74 and the forward clutch gear 80 and open into recesses 296 and 298.

Thus, oil is pumped from the torque converter 26 through the torque converter output shaft bore 270, the shaft rod bore 272, the transversely extending passage 286 into the annular chamber 284 where it is distributed by centrifugal action through passage 288 and opening 292 to the annular recess 296 formed by the dual clutch unit 88 with the reverse clutch gear 74 and through passage 290 and opening 294 to annular recess 298 formed by the forward clutch gear 80 and the dual clutch unit 88. In operation, oil is discharged from passages 292 and 294 and sprayed over the pressure and backing disc plates 166 and 170 by centrifugal action effectuated by the rotation of gears 74 and 80 to lubricate and thus cool the plates. As the oil passes out of the recesses 296 and 298 for return to the transmission oil sump at 52 and then to the torque converter by suitable piping (not shown), it also provides the gears 74, 80, 92 and 110 and 142 with lubrication.

Figure 5:
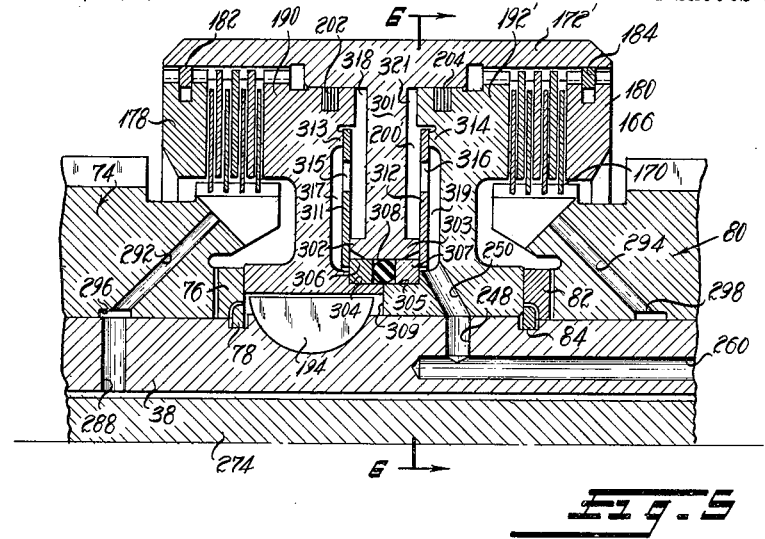
FIGURE 5 is a half view similar to the clutch section of FIGURE 3 showing another embodiment of the piston and pressure chamber area.
Figure 6:
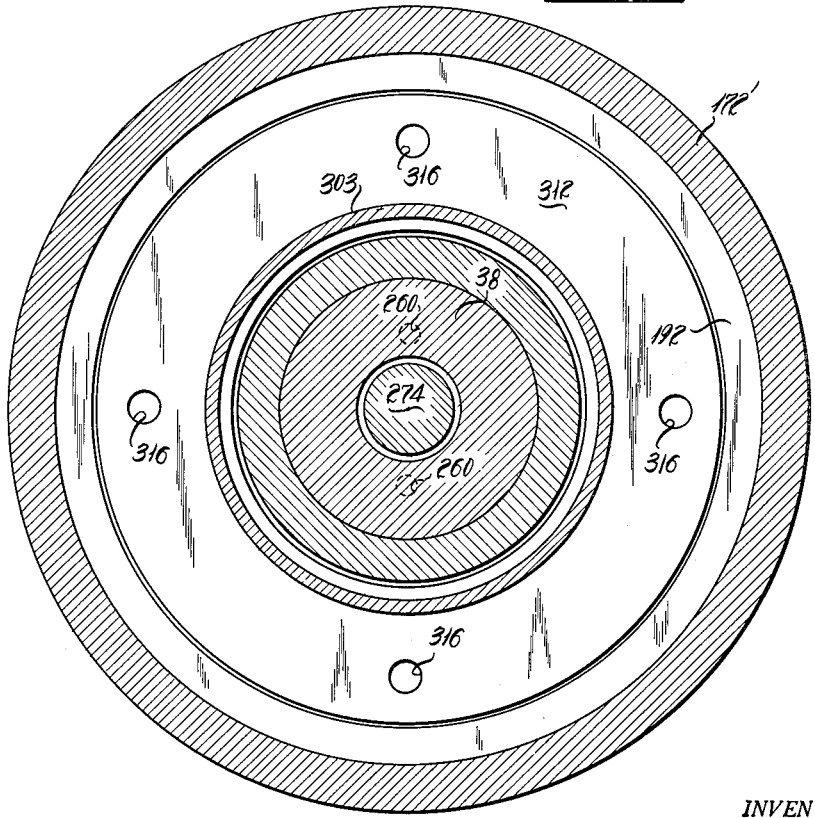
FIGURE 6 is a vertical cross-section through the whole clutch of FIGURE 5 substantially along line 6—6 of FIGURE 5.

In the embodiment illustrated in FIGURES 5 and 6 the collar 172' has the annular piston 301 integral therewith. Oppositely extending annular rims 302 and 303 are formed along the inner periphery of the piston 301. Piston 301 extends into the cavity 200' between the clutch drums 190' and 192' which are mounted on shaft 38 like the corresponding parts in FIGURE 3.

Here the clutch drums 190' and 192' are formed with annular recesses 304 and 305 upon which are press fitted spacer rings 306 and 307. A sealing synthetic rubber O-ring 308 is compressed within the space between rings 306 and 307. The cylindrical outer surfaces of rings 306 and 307 are in bearing engagement with relatively rotatable piston 301, and O-ring 308 provides a seal therefor. The axially facing annular inner surfaces of clutch drums 190' and 192' are in smooth rotative contact on the line indicated at 309.

Disposed within the cavity 200' on opposite sides of piston 301 are springs 311 and 312 in the form of so-called Belleville type springs. These are annular spring plates of dished concave-convex cross-section when relaxed. The normally convex surfaces at the inner peripheries of springs 311 and 312 bear against the radial faces of piston rims 302 and 303 respectively and the radially aligned surfaces of spacer rings 306 and 307 respectively. The opposite surfaces of the springs bear along their outer peripheries upon the smooth surfaces of integral annular rims 313 and 314 projecting into space 200' from the respective clutch drums.

Springs 311 and 312 are formed with spaced apertures 315 and 316, four being shown in FIGURE 6 but any desired number may be provided for purposes of the invention. Springs 311 and 312 are shown in FIGURE 5 as in their compressed collapsed condition where they are substantially flat and oppositely equally urge piston 301 which is shown in neutral drive condition.

It will be observed that spring 311 in one side of cavity 200' effectively separates the space into an outer chamber 317 and an inner chamber 318 connected by apertures 315. Similarly spring 312 effectively separates the cavity space at the other side into chambers 319 and 321 connected by apertures 316.

When the parts are in neutral drive position, the outer peripheries of compressed springs 311 and 312 act axially outwardly in opposite directions upon drums 190′ and 192′ tending to separate them. The inner peripheries of the springs bear on the piston 301 to urge the collar 172′ into centered position where either gear 74 or 80 is clutched to the shaft 38. This prevents drag or sliding friction between the clutch plates in neutral drive.

In shift operation the hydraulic fluid selectively enters opposite sides of the cavity 200′ as in FIGURE 3 to shift the clutch collar 172′ to the forward or reverse drive positions. Each such shift further compresses one of the springs 311 or 312 beyond its normal compresses and stores up energy therein which, when the pressure of the shift fluid is relieved acts to return the collar 172′ toward neutral. The other spring is inactive during this time.

Thus, it will be apparent from the foregoing that there is provided a new improved hydraulic forward and reverse dual clutch unit which facilitates fast acting selective shifting between forward and reverse positions. This clutch unit is particularly applicable to transmission of industrial lift trucks, payloaders, etc., where fast shifting is a requisite for promoting improved maneuverability of the vehicle. The invention further provides a simplified cooling and lubrication system by oil circulated from the fluid torque converter to the friction clutch discs to cool the discs and thereby reduce wear caused by excessive heating. The present invention further provides a pair of opposed spring discs which urge the driving clutch member to a neutral position between forward and reverse positions so that in the disengagement from either the forward or reverse drive gear, the clutch pressure and backing plates are quickly separated. These spring discs further function to facilitate rapid equalization of hydraulic fluid pressure on both sides of the clutch collar piston which is a part of the clutch driving member to enable a fast-acting shifting between the various clutch positions. These spring discs further counteract the forces set up by hydraulic fluid and lubricating oils which tend to misalign the dual clutch unit with the input shaft upon which it is mounted. In accordance with the present invention, these above features are provided in a rugged compact structure for easy manufacturing, installation and maintenance.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle power transmission assembly having axially spaced output gears rotatably mounted on a relatively rotatable input shaft and a dual friction clutch unit mounted about the shaft axially between said gears, said clutch unit comprising annular means substantially rigid with said shaft and providing an outwardly open annular space, a clutch member rotatable with said annular means and axially slidably mounted on said annular means, an annular piston rigid with said clutch member and projecting substantially concentrically into said space so as to provide separate annular fluid pressure chambers at opposite sides thereof, means for slectively introducing fluid under pressure into one or the other of said chambers, spaced sets of friction clutch elements each operatively connected between said clutch member and one of said gears, and means on said clutch member for effecting power transmitting engagement of one or the other of said sets of clutch elements when the clutch member is axially displaced in one direction or the other, the improvement comprising resilient annular plate springs disposed one in each of said chambers with each of said plate springs having an outer peripheral face bearing against one annular side of said annular means and an inner peripheral face oppositely bearing against an annular side of said piston for normally effectively axially centering said piston in said annular space to locate said clutch member in neutral drive position wherein neither set of friction elements is operatively connected in power transmitting relation, said spring plates being so arranged with said piston in centered position that only the radially outermost peripheral portions of said plate springs engage said annular means and only the radially innermost peripheral portions of said plate spring engage said piston.

2. In the vehicle power transmission assembly defined in claim 1, each of said plate springs being apertured for passage of hydraulic fluid therethrough.

3. In the vehicle power transmission assembly defined in claim 1, means providing a resilient fluid tight seal between the inner end of said piston and the inner periphery of said space in said annular means.

4. In the vehicle power transmission assembly defined in claim 1, said annular means comprising axially spaced clutch drums non-rotatably mounted on the shaft and having aligned peripheries on which said clutch member is slidably mounted.

5. In the vehicle power transmission assembly defined in claim 4, said sets of friction elements each comprising interleaved discs slidably and non-rotatably connected respectively to the clutch member and one of said gears, and said clutch member having end flanges for engaging the outermost of said discs at opposite sides of the clutch unit and displacing the engaged set of discs toward the associated clutch drum.

6. In a vehicle power transmission assembly, a rotatably mounted power input shaft, a rotatably mounted reversible output shaft spaced radially apart from said input shaft, means providing forward and reverse gear trains between said shafts, and including axially spaced apart power transmission units having output gears relatively rotatably on said input shaft and clutch disc connecting extensions rigidly extending one from each of said output gears, a dual friction clutch unit mounted about said shaft between said output gears and comprising a clutch member selectively shiftable concentrically along said input shaft, forward and reverse sets of annular clutch friction discs concentric with said input shaft, each of said sets including at least one pressure disc facially engageable with at least one backing disc and axially shiftable relative to said input shaft, said forward and reverse pressure discs being slidably non-rotatably connected respectively to the clutch member and means provided to shift said clutch member by hydraulic pressure from a first supply source to selectively engage respective ones of said forward and reverse pressure discs facially with associated ones of said backing discs, said forward and reverse backing discs being respectively slidably and non-rotatably mounted on respective ones of said extensions to operatively clutch said input shaft to either of said output gears, resilient means continuously urging said clutch member to a neutral position wherein said input shaft is unclutched from said output shaft, means forming separate passageways in said output gears connected to a second supply source independent of said first supply source for introducing oil over said discs by centrifugal action established by rotation of respective ones of said output gears for lubricating and cooling said discs.

7. In a vehicle power transmission assembly having axially spaced output gears rotatably mounted on a relatively rotatable input shaft and a dual friction clutch unit mounted about the shaft axially between said gears, said clutch unit comprising annular means substantially rigid with said shaft and providing an outwardly open annular space, a clutch member rotatable with said annular means and axially slidably mounted on said annular means, an annular piston rigid with said clutch member and projecting substantially concentrically into said space so as to provide separate annular fluid pressure chambers at opposite sides thereof, means for selectively introducing fluid under pressure into one or the other of said chambers, spaced sets of friction clutch elements each operatively connected between said clutch member and one of said gears, and means on said clutch member for effecting power transmitting engagement of one or the other of said sets of clutch elements when the clutch member is axially displaced in one direction or the other, the improvement comprising resilient annular plate springs disposed one in each of said chambers with each of said plate springs having an outer peripheral face bearing against one annular side of said annular means and an inner peripheral face oppositely bearing against an annular side of said piston for normally effectively axially centering said piston in said annular space to locate said clutch member in neutral drive position wherein neither set of friction elements is operatively connected in power transmitting relation, said spring plates being so arranged with said piston in centered position that only the radially outermost peripheral portions of said plate springs engage said annular means substantially at the radially outermost peripheral portions of the annular sides of said annular means defining said space and only the radially innermost peripheral portions of said plate springs engage said piston at the radially innermost periphery thereof.

8. In a vehicle power transmission assembly having axially spaced output gears rotatably mounted on a relatively rotatable input shaft and a dual friction clutch unit mounted about the shaft axially between said gears, said clutch unit comprising annular means substantially rigid with said shaft and providing an outwardly open annular space, a clutch member rotatable with said annular means and axially slidably mounted on said annular means, an annular piston rigid with said clutch member and projecting substantially concentrically into said space so as to provide separate annular fluid pressure chambers at opposite sides thereof, means for selectively introducing fluid under pressure into one or the other of said chambers, spaced sets of friction clutch elements each operatively connected between said clutch member and one of said gears, and means on said clutch member for effecting power transmitting engagement of one or the other of said sets of clutch elements when the clutch member is axially displaced in one direction or the other, the improvement comprising resilient normally dish-shaped annular plate springs disposed one in each of said chambers with each of said plate springs having an outer peripheral face bearing against one annular side of said annular means and an inner peripheral face oppositely bearing against an annular side of said piston for normally effectively axially centering said piston in said annular space to locate said clutch member in neutral drive position wherein neither set of friction elements is operatively connected in power transmitting relation, said ring means substantially rigid with said shaft and having opposed parallel radially extending peripheral face, said piston having an inner axially extending periphery in axially slidable bearing engagement with said ring means and opposed side faces radially aligning with the peripheral faces of said ring means when said piston is centered in said space, said plate springs being compressed flat in parallel relationship to each other when said piston is centered in said space with the innermost peripheral portions of said plate springs in bearing engagement with the radially aligned faces of said piston and said ring means and with the outermost peripheral portions of said plate springs in bearing engagement with said annular means.

9. The vehicle power transmission defined in claim 8 wherein said ring means comprises a pair of axially spaced apart rigid bearing rings fixedly mounted on said annular means and a resilient annular seal disposed axially between said rings in sealing engagement with said rings and said piston.

References Cited in the file of this patent

UNITED STATES PATENTS

| | | |
|---|---|---|
| 2,227,620 | Armitage et al. | Jan. 7, 1941 |
| 2,464,538 | Vanderzee | Mar. 15, 1949 |
| 2,488,540 | Hollingworth | Nov. 22, 1949 |
| 2,596,367 | Brownie | May 13, 1952 |
| 2,868,341 | Snoy | Jan. 13, 1959 |
| 2,920,232 | Richards et al. | Jan. 12, 1960 |